(12) United States Patent
Gooris

(10) Patent No.: US 11,029,530 B2
(45) Date of Patent: Jun. 8, 2021

(54) EYEGLASSES WITH EASY SNAP-ON LENSES

(71) Applicant: Clip Eyewear Limited, Hong Kong (HK)

(72) Inventor: Frederic Frans Petrus Gooris, Hong Kong (HK)

(73) Assignee: Clip Eyewear Limited, Hong Kong (HK)

( * ) Notice: Subject to any disclaimer, the term of this patent is extended or adjusted under 35 U.S.C. 154(b) by 217 days.

(21) Appl. No.: 16/312,269

(22) PCT Filed: Jun. 28, 2017

(86) PCT No.: PCT/IB2017/053850
§ 371 (c)(1),
(2) Date: Dec. 20, 2018

(87) PCT Pub. No.: WO2018/007901
PCT Pub. Date: Jan. 11, 2018

(65) Prior Publication Data
US 2019/0235268 A1    Aug. 1, 2019

Related U.S. Application Data

(60) Provisional application No. 62/358,051, filed on Jul. 3, 2016.

(51) Int. Cl.
*G02C 1/00* (2006.01)
*G02C 1/04* (2006.01)
*G02C 5/00* (2006.01)

(52) U.S. Cl.
CPC .............. *G02C 1/04* (2013.01); *G02C 1/10* (2013.01); *G02C 5/008* (2013.01); *G02C 2200/08* (2013.01)

(58) Field of Classification Search
CPC ........ G02C 1/04; G02C 1/10; G02C 2200/08; G02C 5/008
(Continued)

(56) References Cited

U.S. PATENT DOCUMENTS 6,592,220 B1 * 7/2003 Cheong .................... G02C 1/04
                                                    351/103
6,964,477 B1 * 11/2005 Teng ........................ G02C 1/02
                                                    351/106
(Continued)

FOREIGN PATENT DOCUMENTS

CN          2618181 Y     5/2004
CN        202837697 U     3/2013
(Continued)

OTHER PUBLICATIONS

Examination report No. 1 issued in corresponding Australian patent application No. 2017293435 dated Jul. 17, 2019.
(Continued)

*Primary Examiner* — Jordan M Schwartz
(74) *Attorney, Agent, or Firm* — Idea Intellectual Limited; Margaret A. Burke; Sam T. Yip

(57) ABSTRACT

The present invention provides a pair of eyeglasses that can adapt to different vision needs in each eye and environments of different light intensity. The eyeglasses with easy snap-on lenses allow one to select individual lens of proper vision correction for each eye, and mount the lenses to the eyeglass frame with ease and without the use of any tool.

5 Claims, 5 Drawing Sheets

(58) Field of Classification Search
USPC .............. 351/57, 92, 95–97, 106–107, 154
See application file for complete search history.

(56) References Cited

U.S. PATENT DOCUMENTS

| | | |
|---|---|---|
| 9,081,212 B1 | 7/2015 | Frost et al. |
| 10,012,846 B1 * | 7/2018 | Santinelli ................ G02C 1/10 |
| 2006/0256281 A1 | 11/2006 | Li |
| 2008/0088791 A1 | 4/2008 | Smith |
| 2013/0077042 A1 | 3/2013 | Calilung et al. |

FOREIGN PATENT DOCUMENTS

| | | |
|---|---|---|
| CN | 104460028 A | 3/2015 |
| EP | 1333311 A1 | 8/2003 |
| EP | 1348991 A1 | 10/2003 |
| WO | 2006071377 A2 | 7/2006 |

OTHER PUBLICATIONS

International Search Report of PCT/IB2017/053850 dated Nov. 1, 2017.
European Search Report of corresponding European Patent Application No. 17823728.5 dated Feb. 21, 2020.

* cited by examiner

EYEGLASSES WITH EASY SNAP-ON LENSES

CROSS REFERENCE TO RELATED APPLICATION

This application is a national phase entry of PCT/IB2017/053850 filed on Jun. 28, 2017 which claims priority to U.S. Provisional Patent application No. 62/358,051 filed Jul. 3, 2016; the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to eyewear. In particular, the present invention relates to eyewear with snap-on lenses for easy interchange of lenses for different vision correction.

BACKGROUND

Besides prescription glasses, people often buy multiple pairs of prêt-à-porter readers, one for bedside reading, one for work in the office, and one for driving, etc. The reason is that current mass-market prêt-à-porter readers offer only one vision correction grade for both lenses while the vast majority of people needs different correction for each eye. As a result, one eye always sees out of focus and/or distorted image. Coupled with the needs for different focal lengths and seeing under various lighting conditions, there is an unmet need for more adaptable prêt-à-porter readers that enable interchange of lenses.

SUMMARY OF THE INVENTION

The present invention provides a pair of eyeglasses with easy snap-on lenses to address the shortcomings in current mass-market prêt-à-porter readers. The eyeglasses with easy snap-on lenses offer a combination of features of prêt-à-porter readers and prescription glasses. It is the objective of the present invention to provide a pair of eyeglasses that can adapt to different vision needs in each eye and different ambient light conditions. The eyeglasses with easy snap-on lenses allow one to select individual lens of proper vision correction for each eye, and mount the lenses to the eyeglass frame with ease and without the use of any tool. The lenses of the present eyeglasses are symmetrical such that any one lens can be mounted onto any one side of the rims of the eyeglasses.

BRIEF DESCRIPTION OF THE DRAWINGS

Embodiments of the invention are described in more detail hereinafter with reference to the drawings, in which.

DETAILED DESCRIPTION OF THE INVENTION

In the following description, the present eyeglass frame with easy snap-on lenses are set forth as preferred examples. It will be apparent to those skilled in the art that modifications, including additions and/or substitutions may be made without departing from the scope and the spirit of the invention. Specific details may be omitted so as not to obscure the invention; however, the disclosure is written to enable one skilled in the art to practice the teachings herein without undue experimentation.

Figure 1:
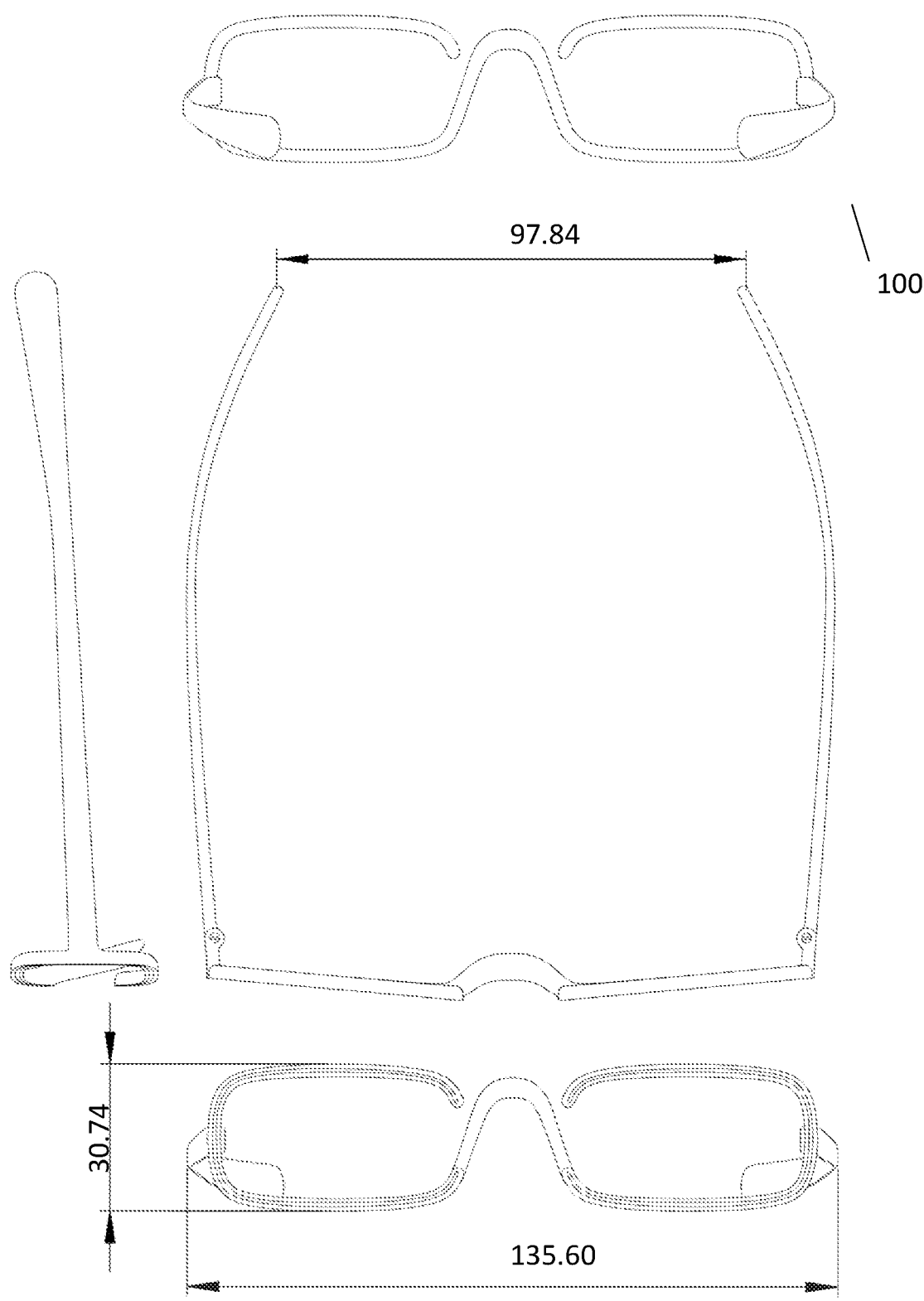
FIG. 1 shows the rear, top, side, and front views of an eyeglass frame in accordance to one embodiment of the present invention.
Figure 2:
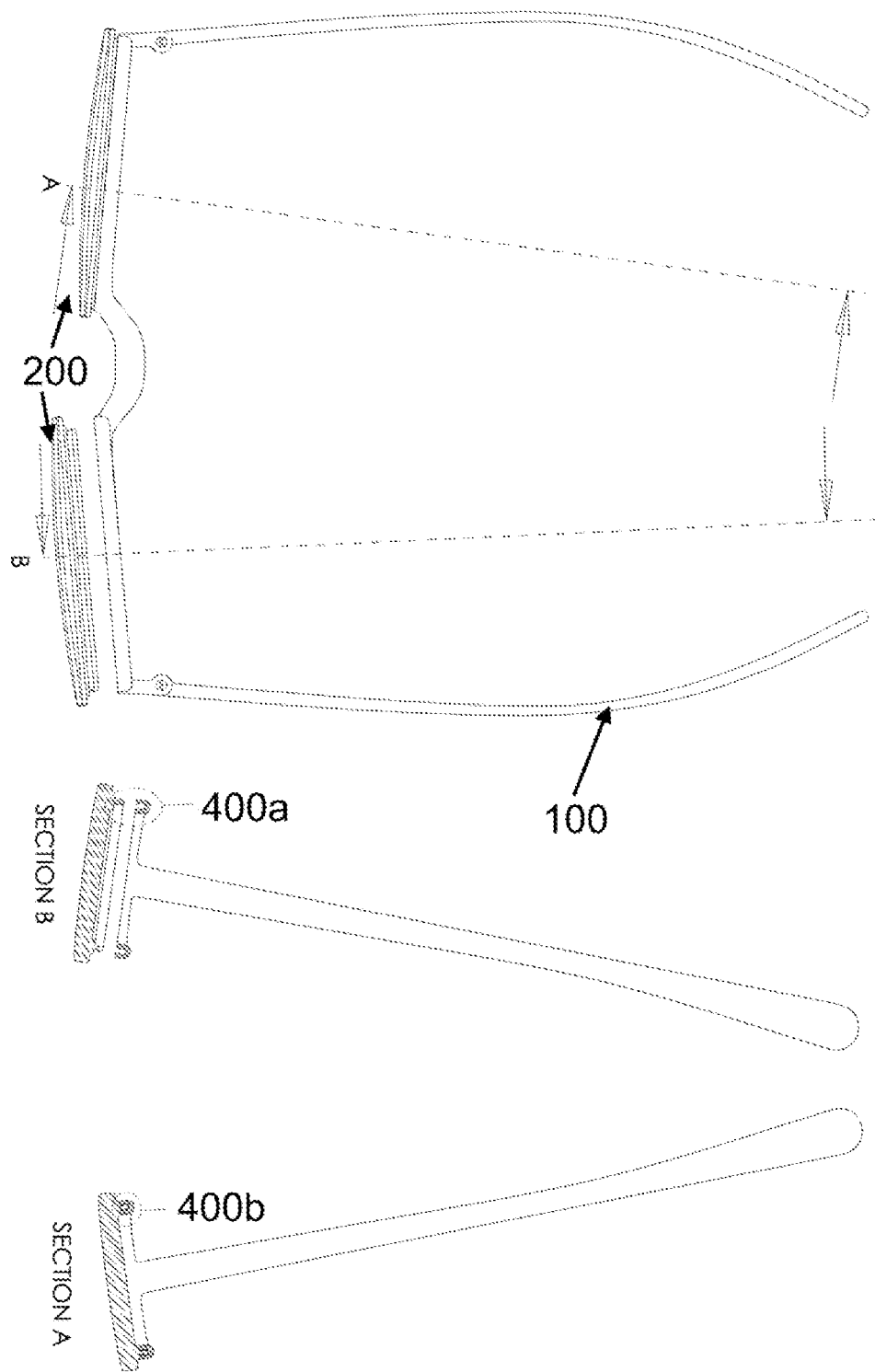
FIG. 2 shows the top view of an eyeglass frame and easy snap-on lenses (top) in accordance to one embodiment of the present invention and its side views of the temples of eyeglass frame and easy snap-on lenses (bottom) taken vertically along point A and point B.

Referring to FIGS. 1 and 2, the present invention is a pair of eyeglasses comprising a frame 100, a pair of lenses 200 and a snap-on mechanism 400 that attaches the pair of lenses onto the frame with a release functionality. FIG. 2 shows the lens and the snap-on mechanism when the lens is separated from the frame (400*a*) and when the lens is mounted onto the frame (400*b*). Referring to FIGS. 2 and 4, the snap-on mechanism 400 comprises a groove 401 at outer surface of each eye rim that is facing away from a wearer when wearing the eyeglasses; and a corresponding flange 403 protruding from wearer facing side when wearing the eyeglasses and around the perimeter of each lens. The flange 403 is an integrated part of the lens. In addition, the groove 401 comprises a notch 402 for clasping corresponding knob 404 that is extended from flange 403 when the lens is mounted on the rim. This secures the lens on the rim once mounted. The groove 401 and notch 402 of the eye rim complement the flange 403 and knob 404 of the lens, respectively, such that the flange snugs into the groove and the knob snugs into the notch. As exemplified in FIG. 3, the flange protrudes from the wearer facing side and partially around the perimeter of the lens. Depending on the aesthetic design and dimensions of the eyeglasses, the flange and the groove may entirely or partially span the perimeter of each lens and each eye rim, respectively. To mount the lens onto the eye rim, the complementing groove and flange of the snap-on mechanism are aligned, a force is applied to push the lens into the eye rim. To detach the lens from the eye rim, a user simply grasps the eye rim and apply a force in a bend-like manner.

Another embodiment of the eyeglasses of the present invention is that the shape of complementary grooves and flanges of the snap-on mechanism for both eyes are symmetrical. This allows lenses of corresponding shape to be fitted for either eye rims. Dimensions in millimeters of one embodiment of the eyeglasses of the present invention are illustrated in FIG. 1. Other overall dimensions, shapes and styles of eyeglass frames are possible so long the shape of the eye rims for both eyes remain symmetrical. This feature of symmetrical lens rims and lenses enables the mass production of identically shaped lenses with various vision correction grades and shades. Interchange of different lenses in the same eyeglass frame in order to adapt to different vision needs and environment is also made possible.

Figure 3:
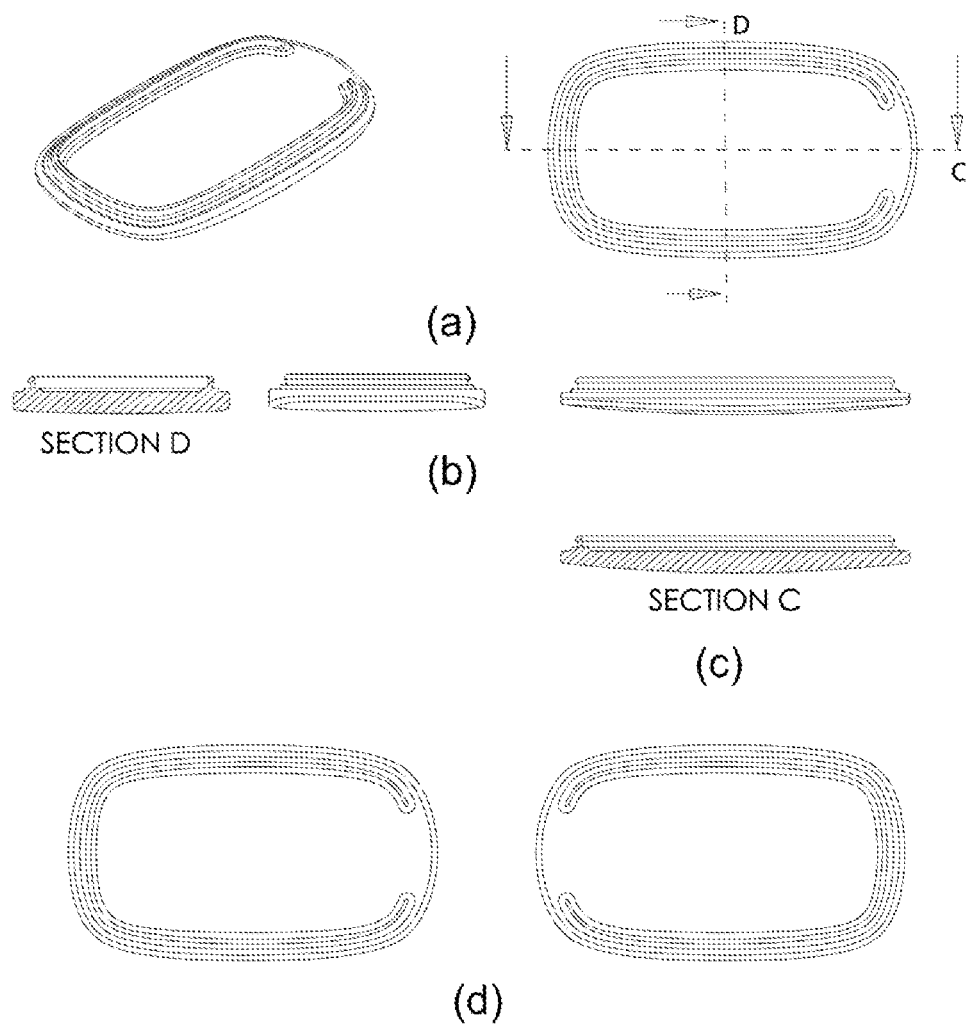
FIG. 3 shows an easy snap-on lens (a), cross section view of an easy snap-on lens taken vertically along line D (b), cross section view of an easy snap-on lens taken vertically along line C (c) and rear view of a pair of easy snap-on lenses (d) in accordance to one embodiment of the present invention.
Figure 4:
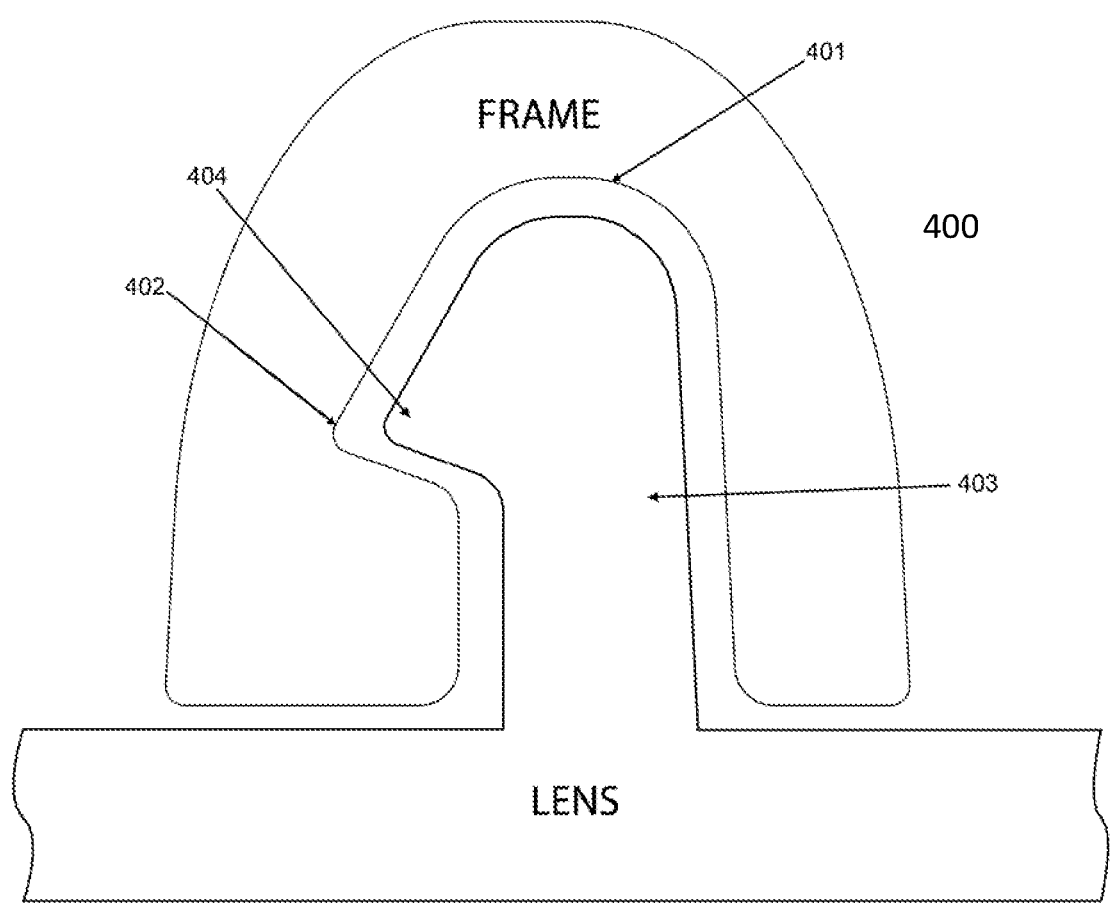
FIG. 4 shows the exploded view of an easy snap-on lenses in accordance to one embodiment of the present invention.

FIGS. 2 and 3 further show the symmetrical aspect of the eye rims and lenses of the eyeglasses with easy snap-on lenses in accordance to one embodiment of the present invention.

The eyeglass frame, or at least the eye rims, is made of material with some degree of elasticity, such as Nylon, which is presently preferred, and polyvinyl chloride (PVC). This allows slight deformity of the groove 401 to accommodate the insertion of the flange 403 when mounting the lens. The mounted lenses then provide the required rigidity to the frame. The eyeglass frame can further include temples, bridge, top bar, nose pads and pad arms as needed for a desired aesthetic design. Other components of the eyeglass frame, such as temples, bridge, top bar, nose pads and pad arms, may be made of material different from the eye rim, including inelastic materials. The eyeglass frame may include a hinge joint to connect the eye rim and temples. In one embodiment, the eyeglass frame may be manufactured as one body without any screws or connective joint. The eyeglass frame of the present invention can be made by 3D-printing.

Figure 5:
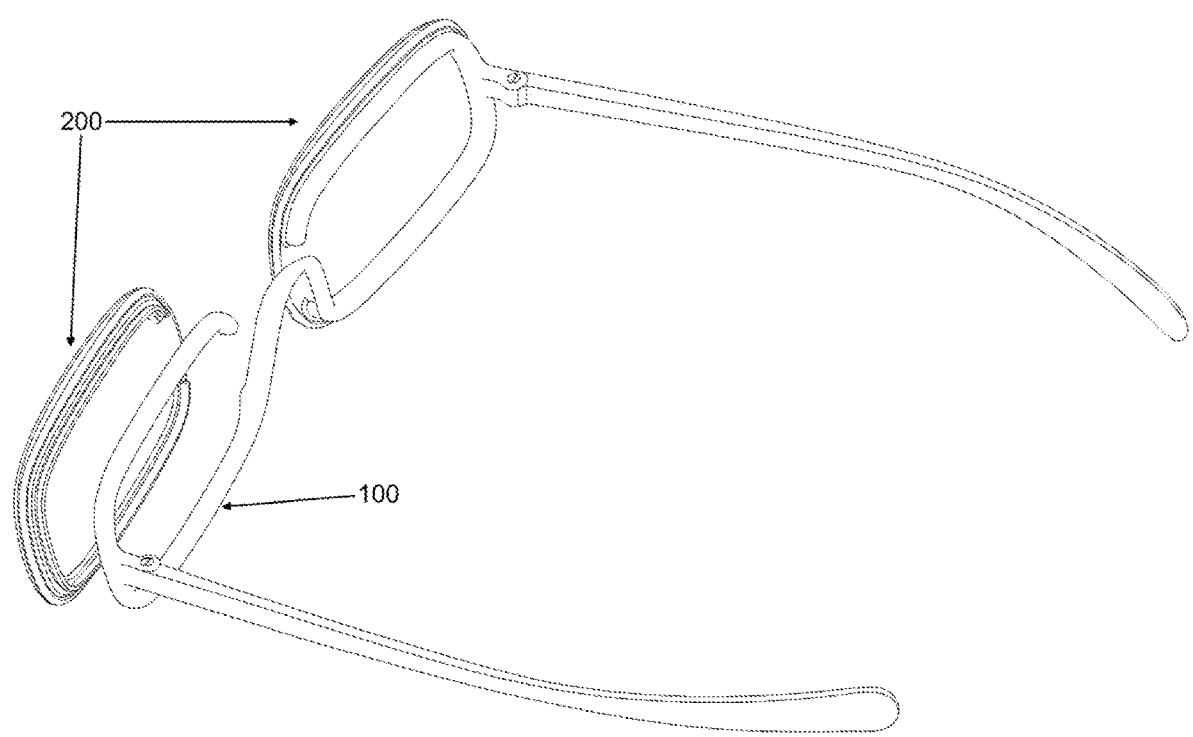
FIG. 5 shows a perspective view of the eyeglass frame and lenses in accordance to one embodiment of the present invention.

FIG. 5 shows a perspective view of another style eyeglass frame and lenses in accordance to one embodiment of the present invention. As exemplified by FIG. 5, the eye rims are incomplete rectangular in shape having grooves complementary to the flanges in the pair of lenses.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. Eyeglasses comprising an eyeglass frame, a pair of lenses and a releasable snap-on mechanism that attaches the pair of lenses onto the frame;
   wherein the frame comprises first and second eye rims, and the pair of lenses comprises first and second lenses;
   wherein the releasable snap-on mechanism comprises first and second grooves, and the first groove is located on the outer surface of the first eye rim, and the second groove is located on the outer surface of the second eye rim, wherein each of the grooves is facing away from a wearer when wearing the eyeglasses, and the releasable snap-on mechanism further comprises first and second flanges, and the first flange is protruding from a wearer facing side of the first lens, and the second flange is protruding from a wearer facing side of the second lens;
   wherein the first and second grooves and the first and second flanges are complementary respectively;
   wherein the first lens is attached to the first eye rim and the second lens is attached to the second eye rim by applying a pushing force on each lens to force the flange of each lens into the groove of each eye rim; and
   wherein the first and second grooves span entirely around perimeter of the first and second eye rims respectively, the first and second flanges span entirely around the perimeter of the first and second lenses respectively.

2. The eyeglasses of claim 1, wherein the first and second grooves comprise first and second notches respectively, and the first and second flanges comprise first and second knobs respectively, the first and second knobs are snugly fitted to the first and second notches respectively to attach the first and second lenses onto the frame.

3. The eyeglasses of claim 1, wherein the flange of the first lens is symmetrical to the flange of the second lens and the groove of the first lens is symmetrical to the groove of the second lens.

4. The eyeglasses of claim 1, wherein the eyeglass frame is made of material with some degree of elasticity, and the lenses attached to the eyeglass frame provide rigidity to the eyeglasses.

5. The eyeglasses of claim 1, wherein the lenses are released from the eye rims by applying a bending force on the eyeglass frame.

* * * * *